E. ALLEN.
Hearse.

No. 95,066. Patented Sept 21, 1869.

United States Patent Office.

EDWIN ALLEN, OF NORWICH, CONNECTICUT.

Letters Patent No. 95,066, dated September 21, 1869.

IMPROVEMENT IN HEARSES.

The Schedule referred to in these Letters Patent and making part of the same.

*To all whom it may concern:*

Be it known that I, EDWIN ALLEN, of Norwich, in the county of New London, and State of Connecticut, have invented a new and useful Improvement in Hearses, and other vehicles; and I do hereby declare that the following is a full, clear, and exact description of the same, reference being had to the accompanying drawings, which form part of this specification.

This invention, though more especially intended for hearses, is also applicable to other vehicles.

It consists in providing the bottom of a hearse or other vehicle with rollers, which are susceptible of being raised or lowered at will, and which, when raised, present a portion of their peripheries above the floor or bottom of the vehicle, for facilitating the running in or out of the coffin or other article, and when lowered sink below the floor, for allowing the coffin or other article to rest firmly on the floor, while the vehicle is in motion.

Referring to the accompanying drawings—

Similar letters of reference indicate corresponding parts in the several figures.

A is the floor or bottom of a hearse, or other vehicle, in which are formed slots $a$, for the purpose hereinafter explained.

Figure 1:
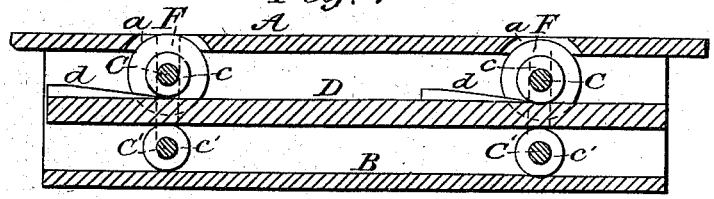
Figure 1 represents a longitudinal section of my invention, showing the rollers lowered.
Figure 2:
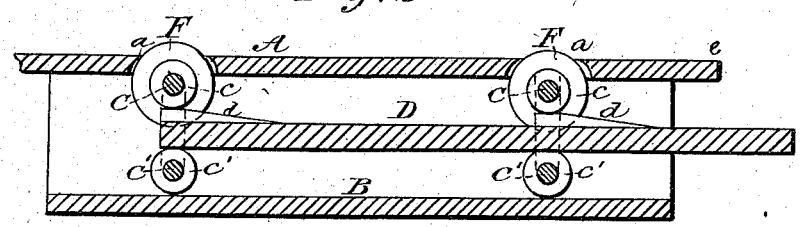
Figure 2 represents a similar view of the same, showing the rollers raised.

To the underside of this floor A is secured a box or frame, B, in each side of which are made two or more slots $b$ $b$, as shown by dotted lines in figs. 1 and 2.

Figure 3:
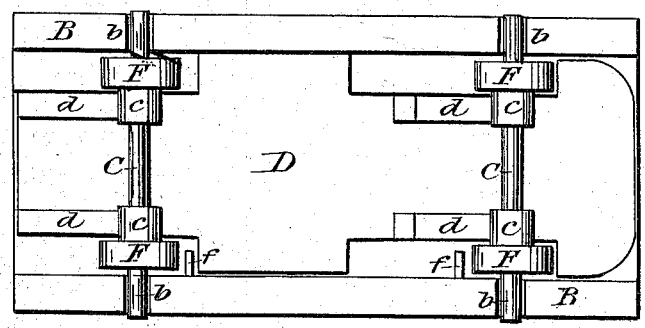
Figure 3 represents a plan view of the same, with the floor of the vehicle removed.

Within these slots $b$ $b$ are retained the extremities of horizontal axles C C. The said axles are arranged in pairs, one pair in each pair of slots $b$, as shown in figs. 1 and 2, and are made to work loosely therein, as shown in fig. 3.

They are provided with fixed rollers $c$ $c$, between which of each axle is arranged an interposed sliding board, D, carrying upon its upper surface wedges $d$. These wedges $d$ are so arranged in relation to the fixed rollers of the upper axles, that by the outward sliding of the said interposed board they are brought under said rollers, thereby elevating the said upper axles, as shown in fig. 2.

F are loose rollers, fitted upon the upper axles C, so as to turn freely thereon, and working in the aforesaid slots $a$ of the floor A, as shown in figs. 1 and 2, so that when the sliding board D is pushed in their position, will be below the surface of the floor A, as shown in fig. 1, but when said board is drawn outwardly, their upper edges will project above the floor A, as shown in fig. 2.

$f$ $f$ are stops, for preventing the board D from sliding too far either way.

When a coffin, if the invention be applied to a hearse, or any heavy article, if it be applied to other vehicle, is to be pushed into the hearse, or said other vehicle, the sliding board D is drawn outwardly, as shown in fig. 2, bringing the upper edges of the rollers F above the surface of the floor, so as to receive the said coffin or article, and facilitate the inward sliding of the same.

When it has been pushed to its proper position within the vehicle, the board D is pushed in, as shown in figs. 1 and 3, so as to allow the rollers F to sink below the surface of the floor A, thus leaving the coffin or other article to rest firmly upon the floor.

What is here claimed, and desired to be secured by Letters Patent, is—

1. The rollers F, in combination with the floor of a hearse or other vehicle, to operate in the manner substantially as and for the purpose herein described.

2. The arrangement of the rollers F, axles C C, and wedge-formed slide $d$, substantially as and for the purpose herein set forth.

EDWIN ALLEN.

Witnesses:
FRED. HAYNES,
R. E. RABEAU.